(12) United States Patent
Sandy et al.

(10) Patent No.: US 7,295,519 B2
(45) Date of Patent: Nov. 13, 2007

(54) METHOD OF QUALITY OF SERVICE BASED FLOW CONTROL WITHIN A DISTRIBUTED SWITCH FABRIC NETWORK

(75) Inventors: Douglas L. Sandy, Chandler, AZ (US); Charles C. Hill, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 950 days.

(21) Appl. No.: 10/600,727

(22) Filed: Jun. 20, 2003

(65) Prior Publication Data

US 2004/0257995 A1    Dec. 23, 2004

(51) Int. Cl.
*H04L 12/26* (2006.01)
*H04J 1/16* (2006.01)

(52) U.S. Cl. ................................ 370/235; 370/412
(58) Field of Classification Search ............... 370/235, 370/400, 412–418
See application file for complete search history.

(56) References Cited

U.S. PATENT DOCUMENTS

| | | | | |
|---|---|---|---|---|
| 5,319,638 | A * | 6/1994 | Lin ........................... | 370/235 |
| 5,768,258 | A * | 6/1998 | Van As et al. ............ | 370/236 |
| 6,188,670 | B1 * | 2/2001 | Lackman et al. .......... | 370/231 |
| 6,256,674 | B1 * | 7/2001 | Manning et al. ........... | 709/232 |
| 6,570,848 | B1 * | 5/2003 | Loughran et al. ........ | 370/230.1 |
| 6,674,721 | B1 * | 1/2004 | Dittia et al. ............... | 370/235 |
| 6,859,435 | B1 * | 2/2005 | Lee et al. ................... | 370/231 |
| 6,957,270 | B1 * | 10/2005 | Erimli et al. .............. | 709/235 |
| 6,981,054 | B1 * | 12/2005 | Krishna ...................... | 709/235 |
| 7,023,857 | B1 * | 4/2006 | Chiussi et al. .......... | 370/395.4 |
| 7,046,632 | B2 * | 5/2006 | Chen et al. ................ | 370/236 |
| 2001/0036181 | A1 * | 11/2001 | Rogers ....................... | 370/389 |
| 2001/0055277 | A1 * | 12/2001 | Steely et al. .............. | 370/236 |
| 2002/0136163 | A1 * | 9/2002 | Kawakami et al. ........ | 370/229 |
| 2002/0172205 | A1 * | 11/2002 | Tagore-Brage et al. | 370/395.42 |
| 2003/0016628 | A1 * | 1/2003 | Kadambi et al. .......... | 370/235 |
| 2003/0117945 | A1 * | 6/2003 | Zboril ....................... | 370/216 |
| 2004/0032827 | A1 * | 2/2004 | Hill et al. .................. | 370/229 |
| 2004/0196859 | A1 * | 10/2004 | Benner ...................... | 370/413 |

* cited by examiner

*Primary Examiner*—Chi Pham
*Assistant Examiner*—Ahmed Elallam

(57) ABSTRACT

In a distributed switch fabric network (300) having a first node (302) having a first node transceiver port (305) and a second node (304) having a second node transceiver port (340), link level flow control (370) operating between the first node transceiver port and the second node transceiver port to in response to a congestion condition (321) in the second node transceiver port, wherein the link level flow control suspends transmission of one of a plurality of priority levels of packets (312) on a channel from the first node transceiver port to the second node transceiver port. The one of the plurality of priority levels of packets accumulates in one of a plurality of a transmit buffers (362) of the first transceiver port, where the one of the plurality of transmit buffers corresponds to the one of the plurality of priority levels of packets. Per-flow flow control (372) operates to modify transmission of the one of the plurality of priority levels of packets to the transmit buffer if the transmit buffer reaches a transmit threshold value (360). Link level flow control operates transparently to a traffic manager (352) of the first node if the congestion condition occurs and the one of the plurality of transmit buffers fails to reach the transmit threshold value.

16 Claims, 6 Drawing Sheets

- *PRIOR ART* -

METHOD OF QUALITY OF SERVICE BASED FLOW CONTROL WITHIN A DISTRIBUTED SWITCH FABRIC NETWORK

BACKGROUND OF THE INVENTION

Advances in high-speed serial interconnects are enabling "mesh" topologies to replace traditional bus-based architectures. Such mesh topologies allow the use of distributed switch fabrics, which offer advantages in cost, scalability, availability and interoperability over bus-based architectures. Also, distributed switch fabrics offer advantages in fault containment over bus-based architectures. For example, each node is responsible for its own traffic. With good flow control, a failure in one node does not impact other nodes. Also, good flow control improves fabric utilization and minimizes packet loss.

Accordingly, there is a significant need for an apparatus and method that improves flow control in a distributed switch fabric.

BRIEF DESCRIPTION OF THE DRAWINGS

Referring to the drawing.

Figure 1:
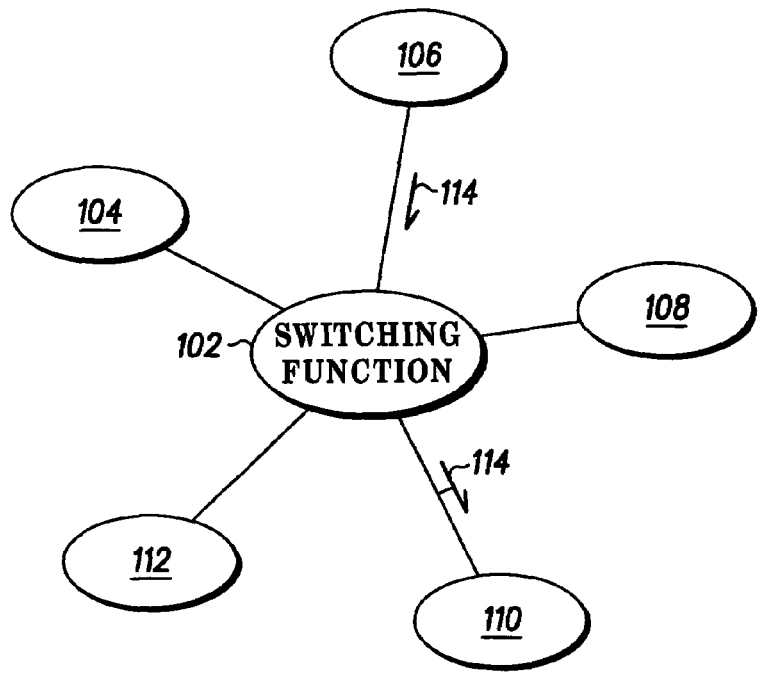
FIG. 1 depicts a block diagram of a prior art switch fabric network.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Although many topologies exist for wiring together systems to transport information, the two most common prior art topologies are bus, and star topologies. Bussed topologies use a multi-drop configuration to connect a variety of resources. Busses are usually wide and slow relative to other topologies. Busses rapidly reach a point of diminishing returns, with reliability becoming problematic as any resource on the bus can compromise the integrity of the whole system.

FIG. 1 depicts a block diagram of a prior art switch fabric network 100. As shown in FIG. 1, a star topology uses point-to-point connections where each node 104-112 uses a dedicated link to send/receive data from a central resource or switching function 102. Data can be in the form of packets 114. As is known in the art, packets 114 generally comprise a header portion that instructs the switching function as to the destination node of the packet 114. In the prior art switch fabric 100 of FIG. 1, each packet sent by a node 104-112 must pass through switching function 102 so that switching function 102 can route the packet to its destination node.

Switching function 102 is usually manifested as a switch card in a chassis. The switch function 102 provides the data/packet distribution for the system. Each node 104-112 can be an individual payload or a sub-network, and can be a leg on a star of the next layer in the hierarchy. Star topologies require redundancy to provide reliability. Reliance on a single switching function can cause a loss of all elements below a failure point. A "dual star" topology (known in the art) is often used for high availability applications. However, even in a "dual star" configuration, the star topology still has a "choke" point that restricts the speed and efficiency of packet transfer and creates a potential failure point within a network.

Figure 2:
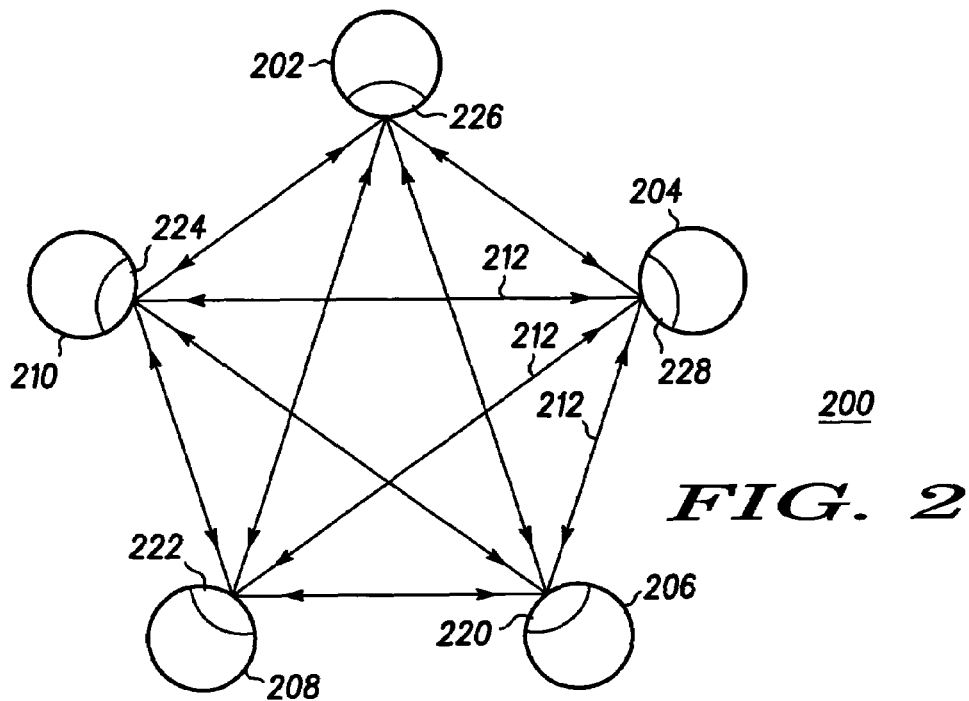
FIG. 2 depicts a block diagram of a distributed switch fabric network according to an embodiment of the invention.

FIG. 2 depicts a block diagram of a distributed switch fabric network 200 according to an embodiment of the invention. As shown in FIG. 2, distributed switch fabric network 200 populates point-to-point connections until all nodes 202-210 have connections to all other nodes 202-210. In this configuration, distributed switch fabric network 200 creates a fully populated, non-blocking fabric. Distributed switch fabric network 200 has a plurality of nodes 202-210 coupled to mesh network 212, in which each node 202-210 has a direct route to all other nodes and does not have to route traffic for other nodes. Instead of the conventional N×N switch in a star topology, each node 202-210 in distributed switch fabric network 200 uses an M, 1×N switch.

In this configuration, the hierarchy found in a star network disappears. Each point can be an endpoint, a router, or both. In distributed switch fabric network 200 each node switches its own traffic (i.e. packets), and therefore has a portion of switching function 220-228. There is no dependence on a central switching function, as all nodes 202-210 are equal in a peer-to-peer system. In other words, each of nodes 202-210 includes at least a portion of switching function 220-228.

The physical layer for interfacing distributed switch fabric network 200 can use, for example and without limitation, 100 ohm differential transmit and receive pairs per channel. Each channel can use high-speed serialization/deserialization (SERDES) and 8b/10b encoding at speeds up to 3.125 Gigabits per second (Gb/s).

Distributed switch fabric network 200 can utilize, for example and without limitation, Common Switch Interface Specification (CSIX) for communication between nodes 202-210. CSIX defines electrical and packet control protocol layers for traffic management and communication. Packet traffic can be serialized over links suitable for a backplane environment. The CSIX packet protocol encapsulates any higher-level protocols allowing interoperability in an open architecture environment.

Distributed switch fabric network 200 can use any network standard for switch fabric networks in open architecture platforms. For example, in an embodiment distributed switch fabric network 200 can use the CompactPCI Serial Mesh Backplane (CSMB) standard as set forth in PCI Industrial Computer Manufacturers Group (PCIMG®) specification 2.20, published by PCIMG, 301 Edgewater Place, Suite 220, Wakefield, Mass. CSMB provides infrastructure for applications such as Asynchronous Transfer Mode (ATM), 3G wireless, other proprietary or consortium based transport protocols, and the like. In another embodiment distributed switch fabric network 200 can use an Advanced Telecom and Computing Architecture (AdvancedTCA™) standard as set forth by PCIMG.

Figure 3:
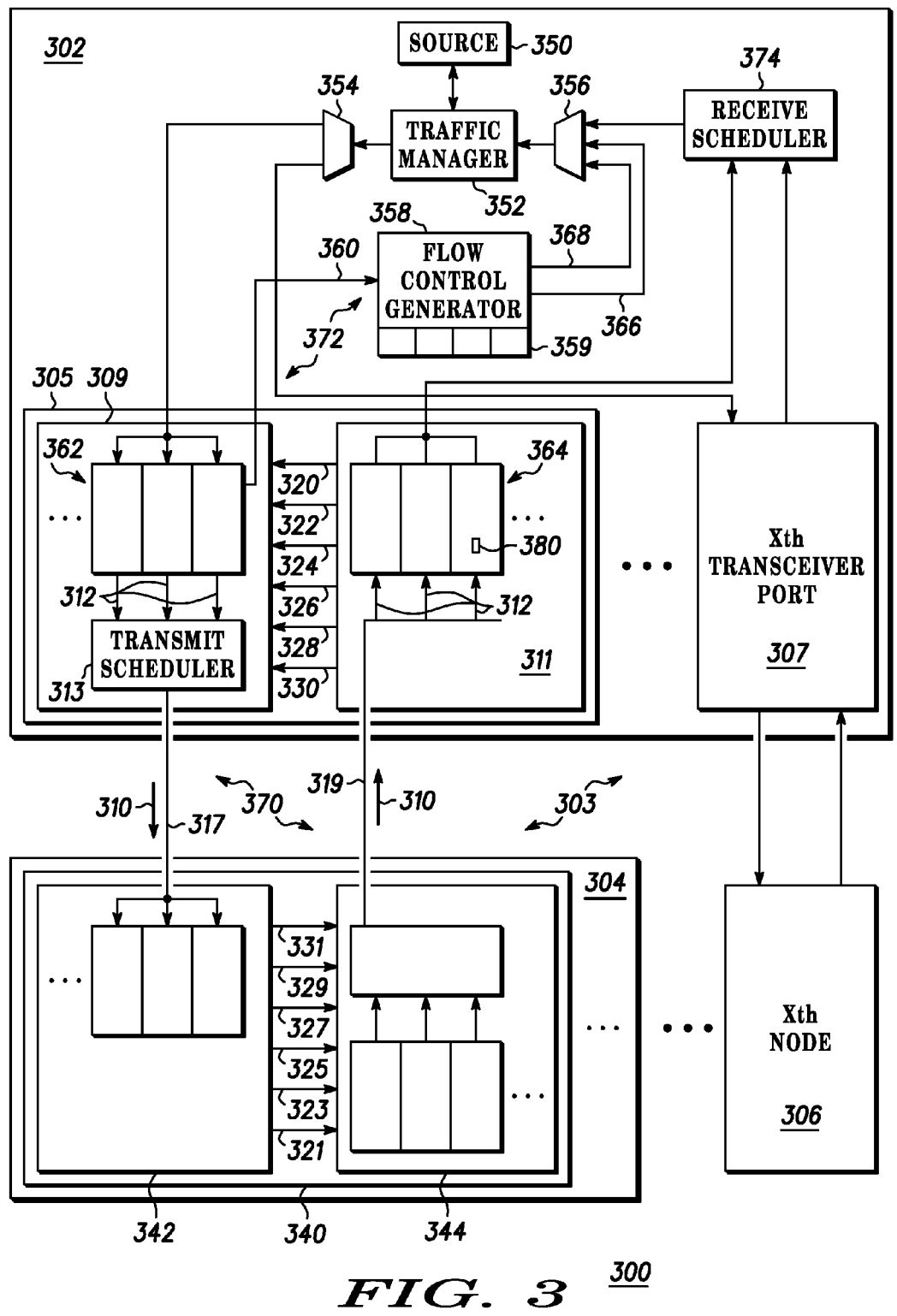
FIG. 3 depicts a more detailed block diagram of a distributed switch fabric network according to an embodiment of the invention.

FIG. 3 depicts a more detailed block diagram of a distributed switch fabric network 300 according to an embodiment of the invention. As shown in FIG. 3, distributed switch fabric network 300 can comprise first node 302, second node 304 and any number of other nodes 306, which may or may not be coupled to mesh network 303. First node 302 has a fabric interface, which includes first node transceiver port 305. Fabric interface can also include any number of other first node transceiver ports 307. First node transceiver port 305 can be coupled to second node transceiver port 340 of second node 304. First node transceiver port 305 and second node transceiver port 340 can communicate and exchange plurality of packets 310 over channel 317, 319. Channel 317 is for outgoing packets from first node 302 to second node 304. Channel 319 is for incoming packets from second node 304 to first node 302. Communication can include, for example and without limitation, sending/receiving packets of data, link level flow control messages, and the like.

Plurality of packets 310 can be divided into plurality of priority levels of packets 312. Plurality of priority levels of packets 312 are plurality of packets 310 that are divided up into any number of priority levels. This can be, for example and without limitation, a plurality of priority levels based on distinctions between class of service, quality of service and the like. Each packet in the plurality of priority levels of packets 312 has a priority level assigned by a traffic manager 352 based on the any given criteria. In an embodiment of the invention, the priority level of the packet can determine which receive or transmit buffer it is stored in and when and how quickly a scheduler schedules the packet to be transmitted to either another node or to the source in a particular node. The ability to distinguish plurality of packets 310 into a plurality of priority levels of packets 312 has the advantage of transmitting or passing the more important packets and more efficiently utilizing the bandwidth of the mesh network 303.

In the embodiment shown in FIG.3, first node transceiver port 305 is comprised of first node transmitter port 309, which is coupled to transmit packets to second node receiver port 342. Also, first node transceiver port 305 is comprised of first node receiver port 311, which is coupled to receive packets from second node transmitter port 344. First node receiver port 309 can include plurality of receive buffers 364 to store plurality of priority levels of packets 312 from second node transmitter port 344. Also, second node receiver port 342 can include plurality of receive buffers to store plurality of priority levels of packets 312 from first node transmitter port 309. Plurality of receive buffers 364 can be a First-in-first-out (FIFO) queue, Virtual Output Queue (VOQ), and the like.

First node transmitter port 309 can include plurality of transmit buffers 362 to store plurality of priority levels of packets 312 before transmission to second node receiver port 342. Also, second node transmitter port 344 can include plurality of transmit buffers to store plurality of priority levels of packets 312 before transmission to first node receiver port 311. Plurality of transmit buffers 362 can be a First-in-first-out (FIFO) queue, Virtual Output Queue (VOQ), and the like.

First node 302 also comprises traffic manager 352. The function of traffic manager 352 is to collect, classify, modify (if necessary) and transport information, usually in the form of plurality of packets 310, to and from second nodes 304 and other nodes 306 in distributed switch fabric network 300. Traffic manager 352 can be, for example and without limitation, a network processor, digital signal processor, and the like. Plurality of packets 310 are generally intended for use by other devices within first node 302 such as source 350. For example, and without limitation, source 350 can include a processor, memory, storage device, and the like.

In an embodiment, traffic manager 352 is coupled to a receive multiplexer 356, which receives plurality of packets 310 from first node transceiver port 305 and other first node transceiver ports 307. Traffic manager 352 can also be coupled to transmit decoder 354, which receives plurality of packets for transmission from traffic manager 352 and distributes to appropriate channels and transceiver ports as is known in the art.

Traffic manager 352 controls and processes all traffic for first node 302. In effect, traffic manager 352 processes plurality of packets 310 that are incoming to first node 302 and outgoing from first node 302. Traffic manager 352 determines which plurality of priority levels of packets 312 go to which channel 317, 319 and the corresponding first node transceiver port 305. To help alleviate any congestion in the transmission of plurality of packets 310, first node transmitter port 309 includes plurality of transmit buffers 362 for storing plurality of priority levels of packets 312 to be transmitted in the event first node transmitter port 309 cannot transmit plurality of priority levels of packets 312 as fast as traffic manager 352 is able to supply plurality of priority levels of packets 312 to channel 317.

First node transmitter port 309 also includes transmit scheduler 313, which schedules and selects the transmission of plurality of priority levels of packets 312 to second node 304 over channel 317. In other words, transmit scheduler 313 selects packets from any of plurality of transmit buffers 362 based on the priority level of packets stored in plurality of transmit buffers 362. Each of plurality of transmit buffers 362 can store a given priority level of packets taken from plurality of priority level of packets 312. By distinguishing between the different priority levels associated with plurality of packets 310, first node 302 and first node transceiver port 305 can more efficiently utilize the bandwidth of channel 317. In an embodiment, each transceiver port in first node 302 has its own plurality of transmit buffers, enabling each transceiver port to distinguish among the plurality of priority levels of packets 312, store each of plurality of priority levels of packets 312 in separate transmit buffers and schedule the transmission of each of plurality of priority levels of packets 312 to second node 304 in an efficient manner. Plurality of priority levels of packets 312 can be scheduled according a scheduling algorithm in accordance with a given application or desirable bandwidth usage pattern. In another embodiment, only some of first node transmitter ports have a plurality of transmit buffers 362.

Plurality of transmit buffers 362 are coupled to flow control generator 358, which is in turn coupled to transmit specialized flow control packets to traffic manager 352 as discussed more fully below. Flow control generator 358 can be used to control packet flow in first node 302. Flow control generator 358 can include plurality of flow control buffers 359. Each of plurality of flow control buffers can correspond to different priority level of packet, where flow control generator can schedule and select from any of the plurality of flow control buffers a packet to transmit. For example, flow control generator can select, based on a given priority, which flow control packets to send downstream to receive multiplexer 356.

For more efficient processing of plurality of packets 310 incoming to first node 302 and to help alleviate any congestion in the receipt and processing of plurality of packets 310, first node receiver port 311 includes plurality of receive buffers 364 for storing plurality of priority levels of packets 312. First node 302 also includes receive scheduler 374, which schedules and selects of plurality of priority levels of packets 312 to be processed by first node 302. In an embodiment, receive scheduler 374 selects packets from any of plurality of receive buffers 364 of any of transceiver ports of first node 302 based on the priority level of packets stored in plurality of receive buffers 364.

Unlike transmit scheduler 313, receive scheduler 374 selects plurality of priority levels of packets 312 from any of transceiver ports of first node 302. Each of plurality of receive buffers 364 can store a given priority level of packets taken from plurality of priority level of packets 312. By distinguishing between the different priority levels associated with plurality of packets 310, first node 302 and first node transceiver port 305 can more efficiently process plurality of priority levels of packets.

In an embodiment, each transceiver port in first node 302 has its own plurality of receive buffers, enabling each transceiver port to distinguish among the plurality of priority levels of packets 312 incoming to first node 302, store each of plurality of priority levels of packets 312 in separate receive buffers and schedule the processing of each of plurality of priority levels of packets 312 by first node 302 in an efficient manner. Plurality of priority levels of packets 312 can be scheduled according a scheduling algorithm in accordance with a given application or desirable bandwidth usage pattern. In another embodiment, only some of first node transceiver ports can have a plurality of receive buffers 364.

In first node 302, plurality of packets 310 (i.e. traffic) move between traffic manager 352 and all of first node transceiver ports. In the transmit direction, traffic manager 352 performs switching by examining a packet and selecting the correct transceiver port and corresponding channel. The capacity of node 302 is determined by the capacity of traffic manager 352.

Although not shown in FIG. 3, second node 304 and any other nodes 306 in distributed switch fabric network 300 can have some or all of the same elements depicted in first node 302. For example, second node 304 can include a traffic manager, flow control generator, and the like. Also like first node 302, second node 304 can include any number of transceiver ports. In addition the transceiver port depicted in first node 302 and second node 304 can have plurality of receive buffers, plurality of transmit buffers or any combination thereof. In an embodiment, each transceiver port in each node does not have to be configured with one or more of plurality of receive buffers, plurality of transmit buffers, receive scheduler and the like. A node with any combination of these elements is within the scope of the invention.

In a distributed switch fabric network 300, first node transceiver port 305 does not necessarily have to operate at the same capacity as traffic manager 352. Traffic needs to be adequately distributed among the various first node transceiver ports such that the average traffic (amount of packets processed by traffic manager 352) matches the capacity of traffic manager 352. For example, and without limitation, 1 Gb/s transceiver ports can support a 2.5 Gb/s traffic manager. In another example, 2.5 Gb/s transceiver ports can support a 10 Gb/s traffic manager. An advantageous feature of distributed switch fabric network 300 is that transceiver ports can each operate at different speeds without necessarily slowing down the mesh network 303.

With a 1-to-N configuration of nodes in distributed switch fabric network 300, it is possible for variations in traffic flows to exceed traffic manager 352 capacity and/or first node transceiver port 305 capacity. This can occur for both receive and transmit traffic where the number of packets received or required to be sent exceeds capacity of the respective downstream element. Although buffering can alleviate lost data incurred by such traffic peaks, buffering alone is generally not adequate and some sort of flow control is required.

In an embodiment of the invention, link level flow control 370 is implemented between first node transceiver port 305 and second node transceiver port 340. Link level flow control 370 is initiated by second node transceiver port 340 coupled to receive plurality of packets over channel 317 from first node transceiver port 305.

In an embodiment, link level flow control 370 operates between first transceiver port 309 that distinguishes between plurality of priority levels of packets 312 and a second node transceiver port 340 that also distinguishes between plurality of priority levels of packets 312. In this embodiment, in order to distinguish between plurality of priority levels of packets, first node transmitter port 309 has plurality of transmit buffers 362 coupled to transmit scheduler 313 and first node receiver port 311 has plurality of receive buffers 364 coupled to receive scheduler 374. In this embodiment, second node transceiver port 340 is equipped analogously.

In the present embodiment, link level flow control operates as follows. First node receiver port 311 detects congestion condition 320 of one of the plurality of priority levels of packets 312 in first node 302. Congestion condition 320 can be, for example, one of plurality of receive buffers 364 in first node receiver port 311 reaching a first receive threshold value (i.e. becoming a certain percentage full, and the like). First node receiver port 311 reports congestion condition 320 to first node transmitter port 309. First node transmitter port 309 then reports congestion condition 320 to second node transceiver port 340, specifically second node receiver port 342 over channel 317. Second node receiver port 342 then transmits priority level stop signal 325 to second node transmitter port 344, where second node transmitter port 344 is coupled to transmit plurality of priority levels of packets 312 to first node receiver port 311 over channel 319. Once second node transmitter port 344 receives priority level stop signal 325, it suspends transmission of the one of the plurality levels of packets over channel 319 to first node transceiver port 305, specifically to first node receiver port 311.

In this embodiment, when congestion condition 320 is detected and link level flow control 370 is operating, only transmission of the one of the plurality of priority levels of packets 312 corresponding to the congestion condition 320 is suspended. Second node transmitter port 344 allows plurality of packets other than the one of the plurality of priority levels of packets 312 corresponding to the congestion condition 320 to continue to first node receiver port 311.

When the first node receiver port buffer empties or falls below a certain level, first node transceiver port 305 detects a clear condition 322. Specifically, first node receiver port 311 detects clear condition 322 and reports clear condition 322 to first node transmitter port 309. First node transmitter port 309 then reports clear condition 322 to second node transceiver port 340, specifically second node receiver port 342 over channel 317. Second node receiver port 342 then transmits a priority level start signal 327 to second node transmitter port 344, where second node transmitter port 344 is coupled to transmit plurality of priority levels of packets 312 to first node receiver port 311. Once second node transmitter port 344 receives priority level start signal 327, it resumes transmission of plurality of priority levels of packets 312 over channel 319 to first node transceiver port 305, specifically to first node receiver port 311.

If the one of the plurality of receive buffers 364 in first node receiver port 311 continues to fill with one of plurality of priority levels of packets 312, the one of the plurality of receive buffers 364 in first node 302 can reach a second receive threshold value. In an analogous manner as the above process, first node transceiver port 305 notifies second node receiver port 342, which transmits a stop signal 329 to second node transmitter port 344. Then second node transmitter port 344 suspends transmission of all of plurality of packets 310 (i.e. all of plurality of priority levels of packets 312) to first node receiver port 311. Analogously, if the one of the plurality of receiver port buffers 364 empties or falls below second receive threshold value, then first node transceiver port 305 notifies second node receiver port 342, which transmits a start signal 331 to second node transmitter port 344. Then second node transmitter port 344 resumes transmission of all but the one of the plurality of priority levels of packets 312.

The above embodiment operates the same if second node transceiver port 340 detects congestion condition 321 and the clear condition 323. In this case, first node receiver port 311 transmits the priority level stop signal 324, priority level start signal 326, stop signal 328 and start signal 330 to first node transmitter port 309.

In another embodiment of the invention, if the congestion condition 321 involves the highest priority level of packets 380 out of the plurality of priority level of packets 312, second node 304 can suspend transmission of all of the plurality of priority levels of packets 312, which includes the highest priority level of packets 380.

In another embodiment, link level flow control 370 operates between first node transceiver port 309 that distinguishes between plurality of priority levels of packets 312 and second node transceiver port 340 that does not distinguish between plurality of priority levels of packets 312. In this embodiment, second node transceiver port 340 fails to distinguish because of the lack of a plurality of transmit buffers and/or plurality of receive buffers that correspond to plurality of priority levels of packets 312.

In this embodiment, when one of the plurality of receive buffers 364 in first node 302 detects congestion condition 320, second node transceiver port 340 is notified as above. However, since second node transmit port 344 does not distinguish between plurality of priority levels of packets 312, stop signal 329 is transmitted from second node receiver port 342 to second node transmitter port 344. Second node transmitter port 344 then suspends transmission of all of the plurality of priority levels of packets 312 over channel 319. Analogously, when clear condition 322 is detected, second node transceiver port 340 is notified and start signal 331 is transmitted from second node receiver port 342 to second node transmitter port 344. Second node transmitter port 344 then resumes transmission of all of the plurality of priority levels of packets 312 to first node receiver port 311.

Link level flow control 370 can operate between first node and second node in either direction as described above. In an embodiment, link level flow control 370 can operate such that first node transceiver port 305 suspends transmission of one of plurality of priority levels of packets 312 to second node transceiver port 340. If first node transceiver port resumes transmission of one of plurality of priority levels of packets 312 to second node transceiver port 340 prior to the corresponding one of plurality of transmit buffers 362 reaching a transmit threshold value 360, then first node transceiver port 305 suspending transmission of one of plurality of priority levels of packets 312 to second node transceiver port 340 operates transparently to traffic manager 352. In other words, if link level flow control 370 operating between first node transceiver port 305 and second node transceiver port 340 operates without the one of the plurality of transmit buffers 362 becoming too full (reaching a transmit threshold value 360), then link level flow control 370 does not trigger flow control messages to traffic manager 352, and therefore link level flow control 370 operates transparently to traffic manager 352. This has the advantage of not burdening traffic manager 352 with managing short-duration flow control conditions between first node transceiver port 305 and corresponding second node transceiver port 340.

With link level flow control 370 operating between first transceiver port 305 and second transceiver port 340, traffic managers in the affected nodes are not burdened with managing these short-duration flow control conditions. This has the advantage of freeing up resources in traffic manager 352. Since each node in distributed switched fabric network 300 manages its own traffic, link level flow control 370 also has the advantage when used in distributed switch fabric network 300 of not requiring traffic managers in different nodes to work together to resolve flow control issues. This further frees up network resources and increases fabric utilization.

In another embodiment, per-flow flow control 372 operates to allow traffic manager 352 to control packet transmission to plurality of transmit buffers 362 in any of the transceiver ports in first node 302. Any one of the plurality of transmit buffers 362 reaching transmit threshold value 360, which can occur whenever one of plurality of transmit buffers 362 fills to a certain percentage of its capacity, can initiate per-flow flow control 372. For example, and without limitation, transmit threshold value 360 can be set at 80% of capacity, 90% of capacity, 100% of capacity, and the like, to suit a given network configuration or operating methodology. Once transmit threshold value 360 is reached, flow control generator 358 detects transmit threshold value 360 and transmits a modify flow control packet 366 to traffic manager 352. Traffic manager 352 then modifies transmission of one of the plurality of priority levels of packets 312 to the corresponding one of the plurality of transmit buffers 362. Modify flow control packet 366 can contain information on which channel corresponding to the nearly full one of plurality of transmit buffers 362 is involved, along with instructions on how traffic manager 352 is to modify packet transmission to the one of the plurality of transmit buffers 362.

In effect, traffic manager 352 is notified that the one of the plurality of transmit buffers 362 corresponding to channel 317 is at transmit threshold value 360 and is imminent danger of becoming full. If the one of the plurality of transmit buffers 362 becomes full, traffic manager 352 may not be able to send the corresponding one of the plurality of priority levels of packets 312 to that transmit buffer. This can result in the condition known as head-of-line (HOL) blocking and can result in packet loss. To prevent HOL blocking and packet loss, traffic manager 352 can modify packet transmission to the one of the plurality of transmit buffers. Any number of the one of the plurality of transmit buffers 362 corresponding to a plurality of priority levels of packets 312 in any of the transceiver ports of first node 302 can utilize this per-flow flow control 372.

Different types of plurality of priority levels of packets 312 can be transmitted over channel 317, 319. For example, voice packets, video packets, data packets, and the like. Voice packets are low duty, fixed latency, high priority traffic that must adhere to a specific latency budget, but can tolerate some packet loss. Data packets, can consume large amounts of bandwidth, has very low priority and can also tolerate some packet loss.

In response to a modify flow control packet 366 from one of the plurality of transmit buffers 362, traffic manager 352 can modify the transmission of the corresponding one of plurality of priority levels of packets 312. In one embodiment, traffic manager 352 can suspend transmission of the one of the plurality of priority levels of packets 312 to the corresponding one of the plurality of transmit buffers 362. In another embodiment, traffic manager 352 can throttle transmission of plurality of priority levels of packets to the corresponding one of the plurality of transmit buffers 362. In this embodiment, traffic manager 352 merely decreases the rate at which the one of the plurality of priority levels of packets 312 are sent to the corresponding one of plurality of transmit buffers 362.

When the one of the plurality of transmit buffers 362 drops below transmit threshold value 360, flow control generator 358 detects the falling below transmit threshold value 360 and transmits a resume transmission packet 368 to traffic manager 352. Thereafter, traffic manager 352 can resume normal transmission of the one of the plurality of priority levels of packets 312 to the corresponding one of the plurality of transmit buffers 362. Resume transmission packet 368 can contain information on which channel corresponding to the nearly full one of plurality of transmit buffers 362 is involved, along with instructions to resume transmission of the one of the plurality of priority levels of packets 312, or resume transmission of the one of the plurality of priority levels of packets 312 under yet another modified flow control scheme.

The embodiment of the invention has the advantage of only involving traffic manager 352 in flow control management if the one of the plurality of transmit buffers 362 reaches transmit threshold value 360. In other words, traffic manager 352 is only involved in flow control at first node 302 if link level flow control 370 causes one of the plurality of priority levels of packets 312 to back up such that transmit threshold value 360 is reached. This reduces traffic manager 352 overhead, as it does not have to be involved with every flow control situation and does not have to coordinate with other traffic managers in other nodes in distributed switch fabric network 300. Still another advantage is that per-flow flow control 372 allows traffic manager 352 to modify one of the plurality of priority levels of packets 312 transmitted to the one of the plurality of transmit buffers 362 while continuing to transmit normally to other ones of the plurality of transmit buffers 362 in any transceiver port of first node 302.

As shown in FIG. 3, first node 302 can include any number of other transceiver ports up to Xth transceiver port 307. Also, other transceiver ports can operate on other channels and be fed by other plurality of transmit buffers, plurality of receive buffers, and the like. Other transceiver port can also be coupled to send/receive plurality of priority levels of packets 312 with other nodes 306 having other traffic managers and other transceiver ports. Any number of transceiver ports and downstream transceiver ports are within the scope of the invention. In an embodiment, one, some or all of transceiver ports of first node 302 can be equipped with plurality of transmit buffers and/or plurality of receive buffers.

Link level flow control 370 and per-flow flow control 372 can operate in any nodes of distributed switch fabric network 300. Since each node handles its own traffic over its own channels to its own transceiver ports, the invention has the advantage of allowing flow control to be handled by the traffic manager responsible for the channel and transceiver port and not burdening other nodes and traffic managers. While the references to other nodes might connote a hierarchical topology within distributed switch fabric network 300, it is noted that by definition, distributed switch fabric network 300 is not a hierarchy, and link level flow control 370 and per-flow flow control 372 can operate at each node as described.

Figure 4:
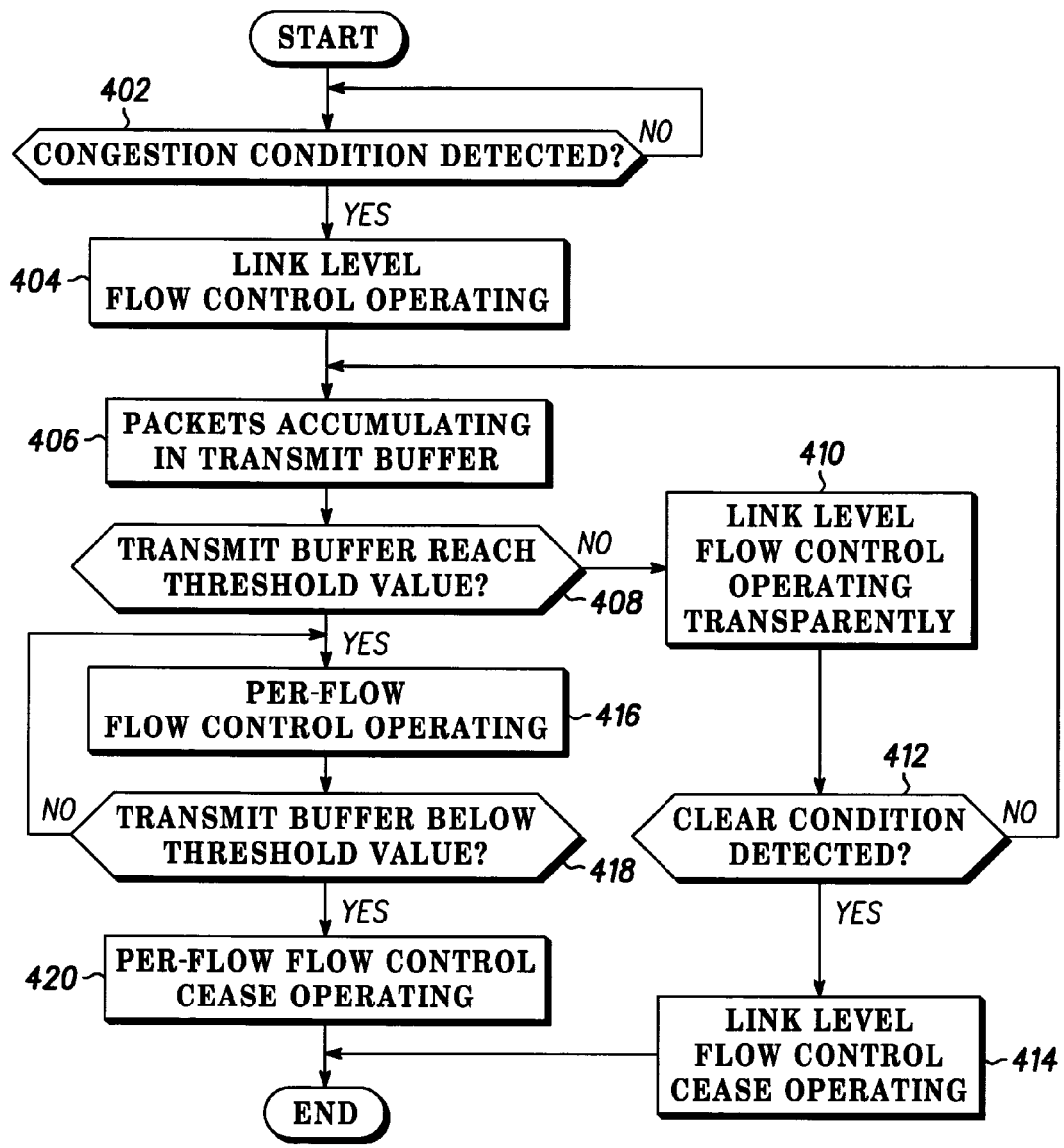
FIG. 4 illustrates a flow diagram of a method of the invention according to an embodiment of the invention.

FIG. 4 illustrates a flow diagram 400 of a method of the invention according to an embodiment of the invention. In step 402, it is determined if congestion condition 321 is detected in second node transceiver port 340. If so, in step 404 link level flow control 370 operates between first node transceiver port 305 and second node transceiver port 340 to alleviate congestion condition 321 in second node transceiver port 340. Specifically, link level flow control 370 operates to suspend transmission of one of a plurality of priority levels of packets 312 on channel 317 from first node transceiver port 305 to second node transceiver port 340.

In step 406, one of a plurality of priority levels of packets 312 accumulate in the one of the plurality of transmit buffers 362 corresponding to the one of the plurality of priority levels of packets 312 while link level flow control 370 is operating. In step 408, it is determined if the one of the plurality of transmit buffers 362 has reached transmit threshold value 360. If not, link level flow control 370 operates transparently to traffic manager 352 per step 410. In other words, traffic manager 352 is not aware that congestion condition 321 has been detected in second node transceiver port 340 and that the transmission of one of the plurality of priority levels of packets 312 over channel 317 from first node transceiver port 305 to second node transceiver port 340 has been suspended.

In step 412, it is determined if clear condition 323 has been detected. If not, plurality of priority levels of packets 312 continue to accumulate in the one of the plurality of transmit buffers 362 as illustrated by the return arrow from step 412 to step 406. If clear condition 323 has been detected in step 412, link level flow control 370 ceases operating per step 414 and the transmission of the one of the plurality of priority levels of packets 312 from first node transceiver port 305 to second node transceiver port 340 resumes.

If the one of the plurality of transmit buffers 362 has reached transmit threshold value 360 in step 408, per-flow flow control 372 operates to modify transmission of the one of the plurality of priority levels of packets 312 to the one of the plurality of transmit buffers 362 per step 416. In an embodiment, flow control generator 358 detects transmit threshold value 360 and transmits modify flow control packet 366 to traffic manager 352. Thereafter, traffic manager 352 modifies the transmission of the one of the plurality of priority levels of packets 312 to the one of the plurality of transmit buffers 362. Operating to modify transmission of packets can include one or more of suspending transmission, throttling transmission of the one of the plurality of priority levels of packets 312, and the like.

In step 418 it is determined if the one of the plurality of transmit buffers 362 is below transmit threshold value 360. If not, per-flow flow control 372 continues to operate as illustrated by the return arrow to step 416. If the one of the plurality of transmit buffers 362 is below transmit threshold value 360, per-flow flow control 372 ceases to operate per step 420. In an embodiment, flow control generator 358 detects the one of the plurality of transmit buffers 362 dropping below transmit threshold value 360 and transmits resume transmission packet 368 to traffic manager 352. Thereafter, traffic manager 352 can resume normal transmission of the one of the plurality of priority levels of packets 312 or initiate a new modified packet transmission scheme to the one of the plurality of transmit buffers 362.

Figure 5:
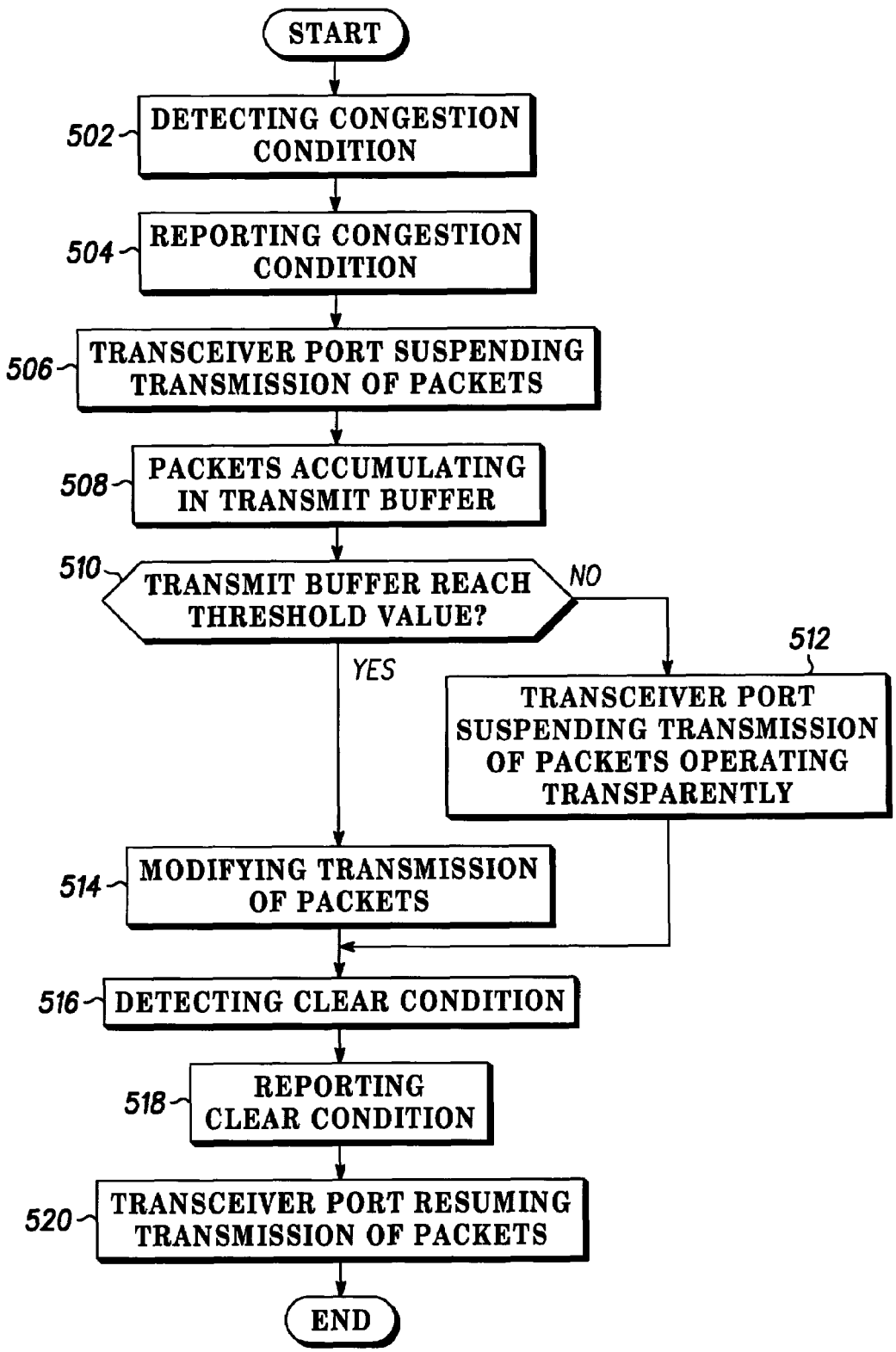
FIG. 5 illustrates a flow diagram of a method of the invention according to another embodiment of the invention.

FIG. 5 illustrates a flow diagram 500 of a method of the invention according to another embodiment of the invention. In step 502, a congestion condition 321 is detected in second node transceiver port 340. In an embodiment, second node receiver port 342 detects congestion condition 321 due to one of plurality of receiver port buffers becoming full or nearly full as described above. In step 504, congestion condition 321 is reported. In an embodiment, congestion condition 321 is reported from second node receiver port 342 to second node transmitter port 344. Subsequently, congestion condition 321 is reported by second node transmitter port 344 to first node receiver port 311.

In step 506, first node transceiver port 305 suspends transmission of one of the plurality of priority levels of packets 312 corresponding to the one of the plurality of receiver port buffers in second node transceiver port 340. In an embodiment, suspending transmission of one of the plurality of priority levels of packets 312 includes first receiver port 311 transmitting priority level stop signal 324 to first node transmitter port 309 and first node transmitter port 309 suspending transmission of the one of the plurality of priority levels of packets corresponding to the one of the second node receiver buffers to second node receiver port 342.

In step 508, the one of the plurality of priority levels of packets 312 accumulate in the one the plurality of transmit buffers 362 corresponding to the one of the plurality of priority levels of packets 312. In step 510, it is determined if the one of the plurality of transmit buffers 362 has reached transmit threshold value 360. If not, first node transceiver port 305 suspending transmission of the one of the plurality of priority levels of packets 312 as described above occurs transparently to traffic manager 352 per step 512. In other words, traffic manager 352 is not aware that congestion condition 321 has been detected in second node transceiver port 340 and that transmission of the one of the plurality of priority levels of packets 312 over channel 317 from first node transceiver port 305 to second node transceiver port 340 has been suspended.

If the one of the plurality of transmit buffers 362 has reached transmit threshold value 360 in step 510, then traffic manager 352 modifies transmission of packets to the one of the plurality of transmit buffers 362 corresponding to the one of the plurality of priority levels of packets 312. In an embodiment, flow control generator 358 detects transmit threshold value 360 and transmits modify flow control packet 366 to traffic manager 352. Thereafter, traffic manager 352 modifies transmission of the one of the plurality of priority levels of packets 312 to the corresponding one of the plurality of transmit buffers 362. Operating to modify transmission of packets can include one or more of suspending transmission, throttling transmission of packets, and the like.

In step 516, clear condition 323 is detected in second node transceiver port 340. In an embodiment, second node receiver port 342 detects clear condition due 323 to the one of the plurality of receiver port buffers in second node transceiver port 340 emptying as described above. In step 518, clear condition 323 is reported. In an embodiment, clear condition 323 is reported from second node receiver port 342 to second node transmitter port 344. Subsequently, clear condition 323 is reported by second node transmitter port 344 to first node receiver port 311.

In step 520, first node transceiver port 305 resumes transmission of the one of the plurality of priority levels of packets 312 over channel 317 to second node transceiver port 340. In an embodiment, resuming transmission of the one of the plurality of priority levels of packets 312 includes first node receiver port 311 transmitting priority level start signal 326 to first node transmitter port 309 and first node transmitter port 309 resuming transmission of the one of the plurality of priority levels of packets 312 to second node receiver port 342 over channel 317.

Figure 6:
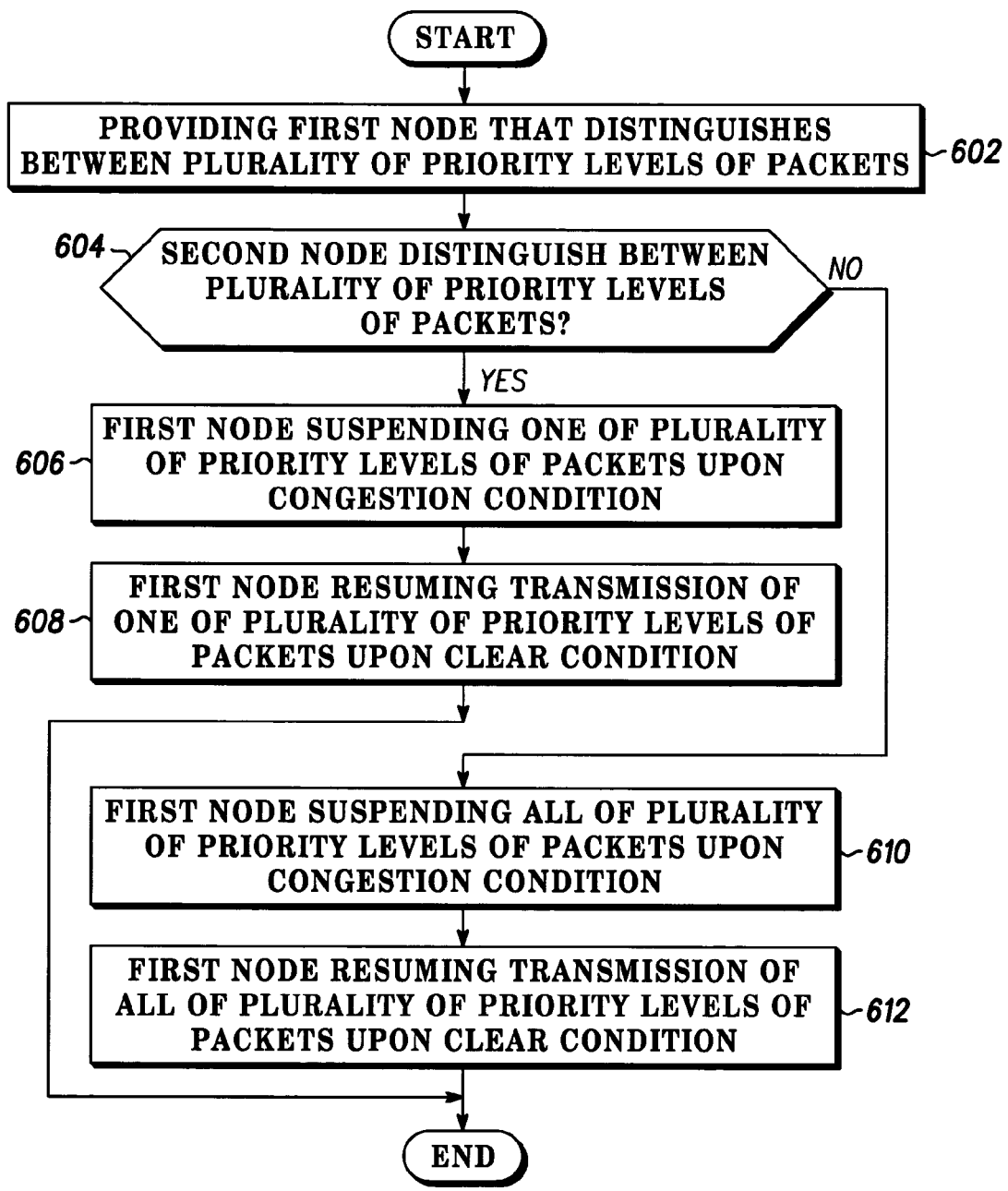
FIG. 6 illustrates a flow diagram of a method of the invention according to yet another embodiment of the invention.

FIG. 6 illustrates a flow diagram 600 of a method of the invention according to yet another embodiment of the invention. Step 602 includes providing a distributed switch fabric network 300 having a first node 302 and a second node 304 coupled to communicate over a channel, wherein the first node 302 distinguishes between a plurality of priority levels of packets 312. In step 604, it is determined if the second node 304 distinguishes between the plurality of priority levels of packets 312. If so, in step 606 first node 302 suspends transmission of one of the plurality of priority levels of packets 312 over the channel to the second node 304 upon a congestion condition 321 of the one of the plurality of priority levels of packets 312 at the second node 304. In step 608, first node 302 resumes transmission of the one of the plurality of priority levels of packets 312 over the channel to the second node 304 upon a clear condition 323 of the one of the plurality of priority levels of packets 312 at the second node 304.

If, in step 604 it is determined that second node 304 fails to distinguish between the plurality of priority levels of packets 312, then first node 302 suspends transmission of all of the plurality priority levels of packets 312 over the channel to the second node 304 upon the congestion condition 321 at the second node 304 in step 610. In step 612, first node 302 resumes transmission of all of the plurality of priority levels of packets 312 over the channel to the second node 304 upon the clear condition 323 at the second node 304.

Figure 7:
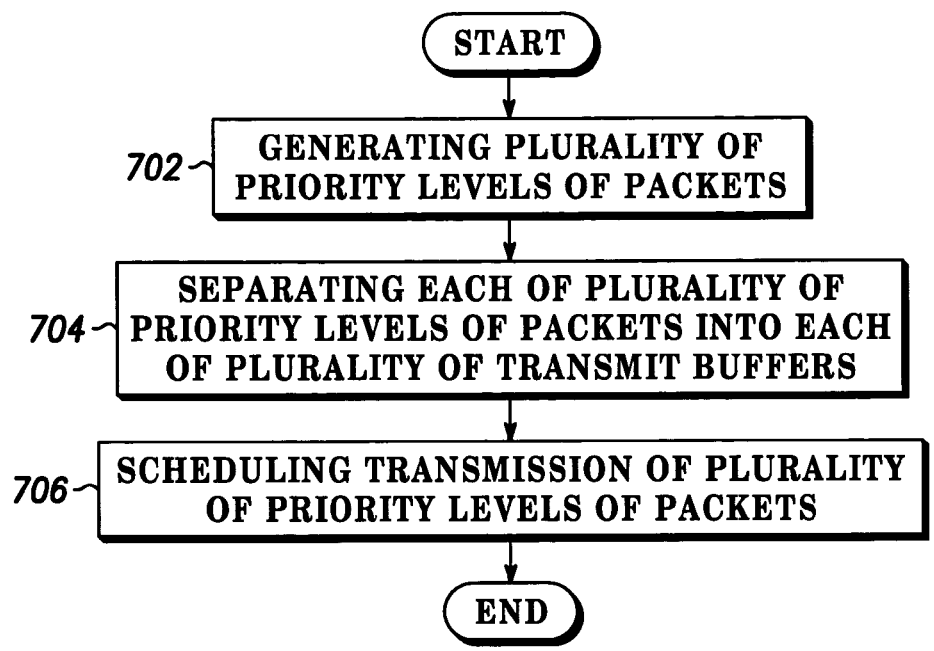
FIG. 7 illustrates a flow diagram of a method of the invention according to still another embodiment of the invention.

FIG. 7 illustrates a flow diagram 700 of a method of the invention according to still another embodiment of the invention. In the embodiment depicted in FIG. 7, a first node 302 is provided, where the first node 302 is coupled to exchange a plurality of packets 310 with a second node 304 over a channel in a distributed switch fabric network 300, wherein the plurality of packets 310 are divided into a plurality of priority levels of packets 312.

In step 702, the first node 302 generates the plurality of priority levels of packets 312 for transmission to the second node 304 over the channel. In step 704, each of the plurality of priority levels of packets 312 are separated into each of a plurality of transmit buffers 362, where each of the plurality of transmit buffers 362 corresponds to one of the plurality of priority levels of packets 312. In step 706, the transmission of the plurality of priority levels of packets 312 to the second node 304 over the channel are scheduled, where scheduling selects which of the plurality of priority levels of packets 312 from each of the plurality of transmit buffers 362 are transmitted to the second node 304. In an embodiment, the separating of step 704 and the scheduling of step 706 occur separately and independently at each of first node transceiver port 305.

Figure 8:
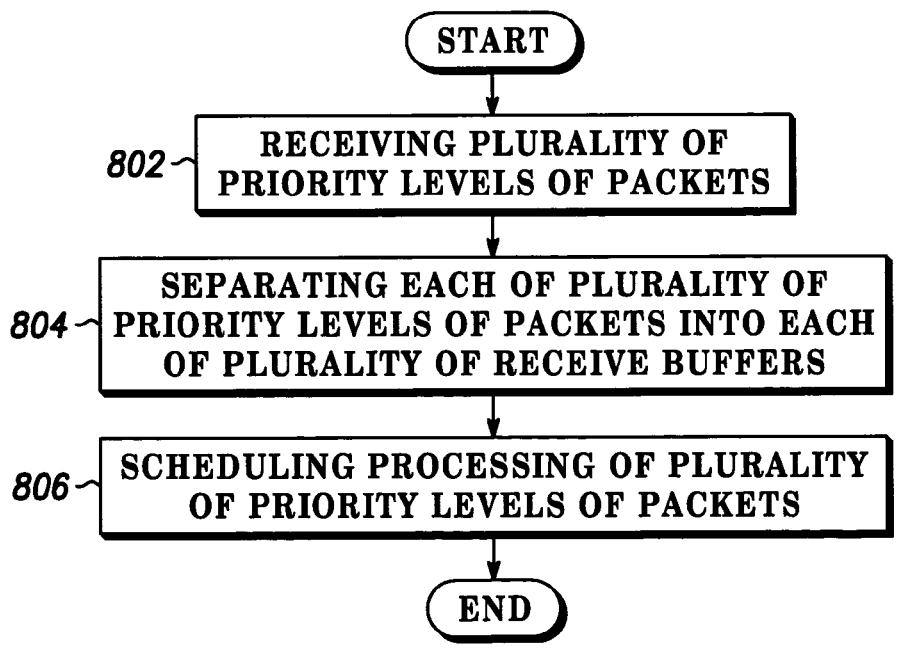
FIG. 8 illustrates a flow diagram of a method of the invention according to still yet another embodiment of the invention.

FIG. 8 illustrates a flow diagram 800 of a method of the invention according to still yet another embodiment of the invention. In the embodiment depicted in FIG. 8, a first node 302 is provided, where the first node 302 is coupled to exchange a plurality of packets 310 with a second node 304 over a channel in a distributed switch fabric network 300, wherein the plurality of packets 310 are divided into a plurality of priority levels of packets 312.

In step 802, the first node receives the plurality of priority levels of packets 312. In step 804, each of the plurality of priority levels of packets 312 is separated into each of a plurality of receive buffers 364, wherein each of the plurality of receive buffers 364 corresponds to one of the plurality of priority levels of packets 312. In step 806, the processing of the plurality of priority levels of packets 312 by the first node 302 is scheduled, where scheduling selects which of the plurality of priority levels of packets 312 from each of the plurality of receive buffers 364 are processed by the first node 302. In an embodiment, the separating of step 804 occurs separately and independently in each first node transceiver port 305. In another embodiment, the scheduling of step 806 comprises selecting the plurality of priority levels of packets 312 from any of the plurality of receive buffers 364 of each first node transceiver port 305.

While we have shown and described specific embodiments of the present invention, further modifications and improvements will occur to those skilled in the art. It is therefore to be understood that appended claims are intended to cover all such modifications and changes as fall within the true spirit and scope of the invention.

The invention claimed is:

1. A method comprising:
   providing a distributed switch fabric network having a first node and a second node coupled to exchange a plurality of packets over a channel, wherein the plurality of packets are divided into a plurality of priority levels of packets;
   detecting a congestion condition of one of the plurality of priority levels of packets in the second node;
   reporting the congestion condition of the one of the plurality of priority levels of packets to the first node;
   the first node suspending transmission of the one of the plurality of priority levels of packets over the channel to the second node;
   detecting a clear condition of the one of the plurality of priority levels of packets in the second node;
   reporting the clear condition of the one of the plurality of priority levels of packets to the first node;
   resuming transmission of the one of the plurality of priority levels of packets from the first node to the second node;
   providing each of the plurality of priority levels of packets with a transmit buffer;
   the one of the plurality of priority levels of packets accumulating in the transmit buffer corresponding to the one of the plurality of priority levels of packets;
   if the transmit buffer corresponding to the one of the plurality of priority levels of packets reaches a transmit threshold value, a traffic manager of the first node modifying transmission of the one of the plurality of priority levels of packets to the transmit buffer; and
   if resuming transmission occurs prior to the transmit buffer reaching the transmit threshold value, the first node suspending transmission of the one of the plurality of priority levels of packets occurring transparently to the traffic manager of the first node.

2. The method of claim 1, wherein the first node modifying transmission of the one of the plurality of priority levels of packets comprises suspending transmission of the one of the plurality of priority levels of packets over the channel to the transmit buffer.

3. The method of claim 1, wherein modifying transmission of the one of the plurality of priority levels of packets comprises throttling transmission of the one of the plurality of priority levels of packets over the channel to the transmit buffer.

4. The method of claim 1, further comprising allowing the plurality of packets other than the one of the plurality of priority levels of packets to continue to the second node over the channel.

5. The method of claim 1, wherein first node comprises a first node transceiver port and the second node comprises a second node transceiver port, and wherein detecting the congestion condition comprises the second node transceiver port detecting the congestion condition.

6. The method of claim 5, wherein reporting the congestion condition comprises the second node transceiver port reporting the congestion condition to the first node transceiver port.

7. The method of claim 5, wherein detecting the clear condition comprises the second node transceiver port detecting the clear condition.

8. The method of claim 5, wherein reporting the clear condition comprises the second node transceiver port reporting the clear condition to the first node transceiver port.

9. A method comprising:
providing a distributed switch fabric network having a first node having a first node transceiver port and a second node having a second node transceiver port;
link level flow control operating between the first node transceiver port and the second node transceiver port to in response to a congestion condition in the second node transceiver port, wherein the link level flow control suspends transmission of one of a plurality of priority levels of packets on a channel from the first node transceiver port to the second node transceiver port;
the one of the plurality of priority levels of packets accumulating in one of a plurality of transmit buffers of the first node transceiver port, wherein the one of the plurality of transmit buffers corresponds to the one of the plurality of priority levels of packets;
per-flow flow control operating to modify transmission of the one of the plurality of priority levels of packets to the one of the plurality of transmit buffers if the one of the plurality of transmit buffers reaches a transmit threshold value; and
link level flow control operating transparently to a traffic manager of the first node if the congestion condition occurs and the one of the plurality of transmit buffers fails to reach the transmit threshold value.

10. The method of claim 9, wherein the first node transceiver port is comprised of a first node receiver port and a first node transmitter port, wherein the second node transceiver port is comprised of a second node receiver port and a second node transmitter port, and wherein the link level flow control operating comprises:
the second node receiver port detecting the congestion condition;
the second node receiver port reporting the congestion condition to the second node transmitter port;
the second node transmitter port reporting the congestion condition to the first node receiver port;
the first node receiver port transmitting a priority level stop signal to the first node transmitter port, wherein the priority level stop signal corresponds to the one of the plurality of priority levels of packets; and
the first node transmitter port suspending transmission of the one of the plurality of priority levels of packets to the second node receiver port.

11. The method of claim 9, wherein the first node transceiver port is comprised of a first node receiver port and a first node transmitter port, wherein the second node transceiver port is comprised of a second node receiver port and a second node transmitter port, and wherein the link level flow control operating comprises:
the second node receiver port detecting a clear condition;
the second node receiver port reporting the clear condition to the second node transmitter port;
the second node transmitter port reporting the clear condition to the first node receiver port;
the first node receiver port transmitting a priority level start signal to the first node transmitter port, wherein the priority level start signal corresponds to the one of the plurality of priority levels of packets; and
the first node transmitter port resuming transmission of the one of the plurality of priority levels of packets to the second node receiver port.

12. The method of claim 9, wherein the per-flow flow control operating comprises:
a flow control generator detecting the one of the plurality of transmit buffers reaching the transmit threshold value and transmitting a modify flow control packet to the traffic manager, wherein the modify flow control packet operates to modify the flow of the one of the plurality of priority levels of packets to the one of the plurality of transmit buffers; and
the flow control generator detecting the one of the plurality of transmit buffers dropping below the transmit threshold value and transmitting a resume transmission packet to the traffic manager, wherein the resume transmission packet operates to resume transmission of the one of the plurality of priority levels of packets to the one of the plurality of transmit buffers.

13. The method of claim 12, further comprising the flow control generator scheduling transmission of a plurality of priority levels of packets, the modify flow control packet and the resume transmission packet to the traffic manager.

14. The method of claim 13, wherein the flow control generator giving priority to the modify flow control packet and the resume transmission packet over the plurality of priority levels of packets.

15. The method of claim 9, wherein operating to modify transmission of the one of the plurality of priority levels of packets comprises suspending transmission of the one of the plurality of priority levels of packets over the channel to the one of the plurality of transmit buffers.

16. The method of claim 9, wherein operating to modify transmission of the one of the plurality of priority levels of packets comprises throttling transmission of the one of the plurality of priority levels of packets over the channel to the one of the plurality of transmit buffers.

* * * * *